United States Patent
Bautista Mester et al.

(10) Patent No.: US 10,953,434 B2
(45) Date of Patent: Mar. 23, 2021

(54) METHOD FOR PRODUCING A MULTILAYER COATING ON A METALLIC SUBSTRATE

(71) Applicant: Akzo Nobel Coatings International B.V., Arnhem (NL)

(72) Inventors: Rafael Bautista Mester, Münster (DE); Paul Davies, Münster (DE); Stephen Corkish, Whitby (GB); Stephen Birch, Cheshire (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/546,837

(22) PCT Filed: Jan. 28, 2016

(86) PCT No.: PCT/EP2016/051789
§ 371 (c)(1),
(2) Date: Jul. 27, 2017

(87) PCT Pub. No.: WO2016/124475
PCT Pub. Date: Aug. 11, 2016

(65) Prior Publication Data
US 2018/0021809 A1 Jan. 25, 2018

(30) Foreign Application Priority Data
Feb. 6, 2015 (EP) .................................. 15154190

(51) Int. Cl.
| | | |
|---|---|---|
| *B05D 7/00* | (2006.01) | |
| *B05D 7/14* | (2006.01) | |
| *C09D 127/06* | (2006.01) | |
| *C09D 175/06* | (2006.01) | |
| *C09D 133/14* | (2006.01) | |
| *C08K 3/22* | (2006.01) | |
| *B32B 27/08* | (2006.01) | |
| *B32B 27/30* | (2006.01) | |

(52) U.S. Cl.
CPC ............... *B05D 7/52* (2013.01); *B05D 7/14* (2013.01); *B32B 27/08* (2013.01); *B32B 27/304* (2013.01); *C08K 3/22* (2013.01); *C09D 127/06* (2013.01); *C09D 133/14* (2013.01); *C09D 175/06* (2013.01); *B05D 7/536* (2013.01); *B05D 2252/02* (2013.01); *B05D 2451/00* (2013.01); *B05D 2601/20* (2013.01)

(58) Field of Classification Search
CPC .. C09D 127/06; C09D 127/16; C09D 175/06; C09D 133/14; C09D 175/04; B05D 7/52–5885; B05D 7/14; B32B 27/08; B32B 27/304; B32B 15/082; C08K 3/22
See application file for complete search history.

(56) References Cited

U.S. PATENT DOCUMENTS

| | | | |
|---|---|---|---|
| 5,370,909 A * | 12/1994 | Tanaka | C23C 22/23 252/389.2 |
| 5,731,042 A | 3/1998 | Glende et al. | |
| 6,277,497 B1 * | 8/2001 | Aerts | C08G 18/423 428/482 |
| 8,026,314 B2 | 9/2011 | Hansel et al. | |
| 2004/0062873 A1 | 4/2004 | Jung et al. | |
| 2006/0093768 A1 * | 5/2006 | Parekh | C08G 18/4202 428/35.8 |
| 2007/0289498 A1 * | 12/2007 | Geilen | C08K 5/0016 106/287.28 |
| 2012/0276315 A1 | 11/2012 | Michel et al. | |
| 2016/0145427 A1 * | 5/2016 | Eng | C08K 5/06 524/100 |

FOREIGN PATENT DOCUMENTS

| | | | |
|---|---|---|---|
| DE | 19632426 A1 | 1/1998 | |
| EP | 0219131 A2 * | 4/1987 | ........... C08G 18/622 |
| EP | 0 453 917 A1 | 10/1991 | |
| JP | S57167251 | 10/1982 | |
| JP | H05320547 | 12/1993 | |
| WO | 2008/137562 A1 | 11/2008 | |
| WO | 2010/112605 A1 | 10/2010 | |
| WO | 2012/076417 A2 | 6/2012 | |
| WO | 2014/025411 A1 | 2/2014 | |

OTHER PUBLICATIONS

Machine translation of JP H05-320547 A (2019).*
Tinuvin 5060 data sheet, published on May 31, 2011, pp. 1-3.
Zheng et al., "Stabilizers (1st edition)", National Defense Industry Press, 2011, 309-310.
Yu et al., "Coating material (1st edition)", China Materials Press, 2001, pp. 60-61 and 72-74.

* cited by examiner

*Primary Examiner* — Kregg T Brooks
(74) *Attorney, Agent, or Firm* — McDonnell Boehnen Hulbert & Berghoff LLP

(57) ABSTRACT

The present invention relates to a method for producing a multilayer coating on a metallic substrate, comprising, in the given order, (1) producing a polyvinyl chloride plastisol layer on the metallic substrate, comprising the application of a polyvinyl chloride plastisol material to the metallic substrate, (2) producing a thermosetting and/or thermoplastic topcoat layer directly on the polyvinyl chloride plastisol layer, comprising the application of a thermosetting and/or thermoplastic coating material directly to the polyvinyl chloride plastisol layer, wherein both the polyvinyl chloride plastisol material and the thermosetting and/or thermoplastic coating material comprise a layered double hydroxide.

19 Claims, No Drawings

METHOD FOR PRODUCING A MULTILAYER COATING ON A METALLIC SUBSTRATE

This is the US national phase under 35 U.S.C. § 371 of international application PCT/EP2016/051789, filed Jan. 28, 2016, which claims priority to European application EP 15154190.1, filed Feb. 6, 2015.

The present invention relates to a novel method for producing a multilayer coating on a metallic substrate as well as to the multilayer coating produced by said method. The multilayer coating enables outstanding weathering durability across a broad range of climatological conditions. In particular, it enables excellent corrosion resistance and resistance to solar radiation. Therefore, the method for producing the multilayer coating as well as the multilayer coating itself are very well suited for producing weathering resistant elements in the architectural sector, e.g. construction elements. The novel process can advantageously be conducted via coil coating, i.e. the individual layers of the multilayer coating can advantageously be applied by coil coating. After production of such a multilayer coil coating, the coil can be rolled out at any time and cut and formed into individual elements required for production of e.g. construction elements.

STATE OF THE ART

Many durable organic coil coatings on metal substrates that are used in the architectural sector receive a warranty that supports the finished appearance during the life time of the product. However, the warranty is usually limited to certain geographical locations by the performance of the coating system as a result of inherent weaknesses. These climatological weaknesses reduce the life expectancy of a super durable system. For example, polyvinyl chloride (PVC) plastisol coating layers have excellent UV and corrosion resistance properties and are included in warranties of up to 40 years in regions such as northern Europe. However, the usage of PVC plastisols becomes limited in hotter climates, such as southern Europe and, in particular, regions with prolonged high temperatures such as the Middle East, Northern Africa, etc. In contrast, typical thermosetting and/or thermoplastic coating layers have exceptional UV and thermal resistance properties and so are perfectly suited for high UV and thermal climates. However, such thermosetting and/or thermoplastic coatings have a more limited resistance in regions of high moisture content, such as coastal areas and areas of high rain fall leading to greater levels of corrosion and blistering.

Different multi-layer systems exist and have been developed to try and minimise one particular weakness, such as corrosion resistance. However, there still is a need for systems that adequately combine the leading technology in corrosion resistance of PVC plastisols coatings with the UV and thermal resistance of thermosetting and/or thermoplastic coatings in the architectural coil coatings industry. Existing technologies that combine PVC plastisols with thermosetting and/or thermoplastic coatings, such as acrylics, are not capable of the extended life expectancies required for the architectural industry.

Problem and Technical Solution

Accordingly, the problem addressed by the present invention was that of finding a method for producing a multilayer coating on a metallic substrate, which results in a multi-layer coating that provides outstanding weathering durability across a broad range of climatological conditions. In particular, the multilayer coating should combine excellent corrosion resistance with high UV and thermal resistance properties. Besides, the multi-layer coating should also offer further technical advantages such as the ability to emboss the coating with a decorative pattern or corporate logo, or to enable features such as water potability, enhanced fire resistance and special optical effects. By this means, it would be possible to provide a multilayer coated metallic substrate which is very well suited for producing weathering resistant elements in, for example, the architectural sector, for example construction elements.

It has been found that the problems mentioned are solved by a novel method for producing a multilayer coating on a metallic substrate, comprising, in the given order, (1) producing a polyvinyl chloride plastisol coating layer on the metallic substrate, comprising the application of a polyvinyl chloride plastisol material to the metallic substrate, (2) producing a thermosetting and/or thermoplastic topcoat layer directly on the polyvinyl chloride plastisol layer, comprising the application of a thermosetting and/or thermoplastic coating material directly to the polyvinyl chloride plastisol layer, characterized in that both the polyvinyl chloride plastisol material and the thermosetting and/or thermoplastic coating material comprise a layered double hydroxide.

The abovementioned method is also referred to hereinafter as method of the invention, and accordingly forms part of the subject matter of the present invention. Preferred embodiments of the method of the invention can be found in the description which follows below and in the dependent claims.

The present invention further provides a multilayer coating which has been produced by the method of the invention.

The method of the invention allows the production of multilayer coatings possessing outstanding weathering durability across a broad range of climatological conditions, in particular excellent corrosion resistance and resistance to solar radiation.

DETAILED DESCRIPTION

First of all, some of the terms used in the present invention will be elucidated.

The application of a coating material, for example a polyvinyl chloride plastisol material, to a substrate, is understood as follows. The respective coating material is applied in such a way that the coating layer produced therefrom is arranged on the substrate, but need not necessarily be in direct contact with the substrate. Other layers, for example, may also be arranged between the coating layer and the substrate. For example, in stage (1) of the method of the invention, the polyvinyl chloride plastisol coating layer is produced on the metallic substrate, but other layers like a conversion coating, such as a zinc phosphate coating, and/or a typical primer layer may be arranged between the substrate and the plastisol coating layer.

The same principle applies to the application of a coating material (b) to a coating layer (A) produced by means of another coating material (a), or to the production of a coating layer (B) on another coating layer (A) arranged, for example, on the metallic substrate. The coating layer (B) need not necessarily be in contact with the coating layer (A), but merely has to be arranged above it, i.e. on the side of the coating layer (A) facing away from the metallic substrate.

In contrast, the application of a coating material directly to a substrate is understood as follows. The respective coating material is applied in such a way that the coating layer produced therefrom is arranged on the substrate and is in direct contact with the substrate. Thus, more particularly, no other layer is arranged between coating layer and substrate. Of course, the same applies to the application of a coating material (b) directly to a coating layer (A) produced by means of another coating material (a), or to the production of a coating layer (B) directly on another coating layer (A) arranged, for example, on the metallic substrate. In this case, the two coating layers are in direct contact, i.e. are arranged directly one on top of the other. More particularly, there is no further layer between the coating layers (A) and (B).

In the context of the present invention, "curing" is understood to have the meaning familiar to the person skilled in the art in connection with methods for production of multilayer coatings.

Accordingly, curing of a coating layer is understood to mean the conversion of such a layer to the ready-to-use state, i.e. to a state in which the substrate provided with the respective coating layer can be transported, stored and used as intended. More particularly, a cured coating layer is no longer soft or tacky, but has been conditioned as a solid coating layer which does not undergo any further significant change in its properties, such as hardness or adhesion on the substrate, even under further exposure to curing conditions as described below.

As is well known, coating materials can in principle be cured physically and/or chemically, according to the components present, such as binders and crosslinking agents. In the case of chemical curing, thermochemical curing shall be described. If a coating material is thermochemically curable, it may be self-crosslinking and/or externally crosslinking. The statement that a coating material is self-crosslinking and/or externally crosslinking in the context of the present invention should be understood to mean that this coating material comprises polymers as binders and optionally crosslinking agents, which can correspondingly crosslink with one another by means of chemical reaction of reactive functional groups. The activation energy for these chemical reactions may be provided through thermal energy, i.e. through heating. The underlying mechanisms and usable binders and crosslinking agents are described below in more detail. Such thermochemically curable materials are also called thermosetting coating materials.

In the context of the present invention, "physically curable" or the term "physical curing" means the formation of a cured coating layer through, for example, interlooping of polymer chains in polymeric solutions and/or unification and fusion of polymer particles in polymeric dispersions like organosols or hydrosols, whereby said interlooping and/or unification and fusion is normally accompanied by solvent evaporation. Often, physical curing is triggered or enhanced by means of heating the coating material, for example, in order to evaporate solvents.

As described, physical curing may involve different means and mechanisms. However, physical curing per se does not involve chemical reaction of reactive functional groups of binders and optional crosslinking agents.

For example, the curing process of a polyvinyl chloride plastisol material also is a physical curing process. As known, plastisol materials are suspensions of thermoplastic polymer particles in liquid plasticizers, whereby the polymer practically will not dissolve in the plasticizers at moderate temperatures like room temperature, i.e. a temperature from e.g. 15° C. to 30° C. However, when the plastisols are sufficiently heated, the plasticizers diffuse into the dispersed polymer particles, where they lodge between the macromolecules and hence produce plasticization of the PVC plastisols. On cooling, a permanently plasticized solid ("cured") product, for example a cured PVC plastisol layer, results.

Also, the curing of thermoplastic coating materials like, for example, thermoplastic polyvinylidene fluoride coating materials is a physical curing process. Normally, polyvinylidene fluoride coating materials are formulated as organosols, i.e. dispersions based on polyvinylidene fluoride in organic solvents. Again, curing of such a material does not involve chemical reaction of functional groups, for example, binder polymers, but mechanisms of physical curing processes. For example, by heating a thermoplastic material, the thermoplastic polymers are fluidized and solvents are evaporated, whereby polymer particles converge and a homogeneous layer is formed which solidifies upon cooling to, for example, room temperature (20 to 25° C.).

Of course, in the curing of a coating materials described as chemically curable, it is always also possible for physical curing to occur. Nevertheless, such a coating composition is described as chemically curable in that case.

The Method of the Invention

In the method of the invention, a multilayer coating is formed on a metallic substrate.

As is known, the most efficient means of coating a metal with an organic protective material is via a coil coating line process. In the following, the coil coating process will be described in general.

Coil coating is a continuous, high-volume process that produces a consistent product in comparison to post-coating methods. Coil coating provides for controls that are virtually impossible to attain with most other painting processes. Dealing with a flat sheet enables excellent control of coating weights of both the pretreatment and the polymer-based coating material. For example, in one continuous process, a coil of metal, up to 2.6 meter wide moving at up to 200 m/min, is unwound and both the top and bottom sides are cleaned, chemically treated, primed, oven cured, top coated, oven cured again (a process that may be repeated with multiple coating layers) rewound and packaged for shipment.

Coil coating is a special form of roll coating and, occasionally, of the spray coating and flow coating of metal strips (coils) with liquid coating materials. It is a continuous process. All work steps, such as cleaning, pretreatment, coating, and curing, etc., can be carried out in one operation on one line. Schematically, coil coating embraces the following steps: coils of various gauge, width and length are fed into the line in a continuous process based on the end user requirements for the coil.

Coils are stitched together through means of mechanical stitch, although other methods, such as welding and adhesives are in use. Prior to coating application the strip preferably is suitably pretreated. The effective pretreatment of the substrate can have a vital role in providing compatibility between the substrate and the applied organic coating material, in order to ensure that the optimum adhesion and corrosion resistance characteristics of that coating layer are obtained. The pretreatment process normally begins with a suitable cleaning stage, where typically a rotary brush (or multiple brushes) will remove any localized corrosion from the metallic substrate surface, followed by the careful application of an alkali cleaner used to remove organic soils from, for example, zinc and steel substrates. Alkali cleaning can also be used for aluminum substrates, although acidic cleaning can also be used. The remaining cleaning solution is removed from the surface through use of a rinse stage. Typical rinsing stages include multiple rinse sections, typically in a reverse cascade system, whereby fresh water is fed into the end of the rinsing stage which is then fed into the previous rinse tank and so on. No rinse pretreatments are also available, whereby the residual cleaners are squeegee roll removed from the surface. After cleaning and rinsing, the substrate normally is then chemically pretreated. With a rinsed system, the application will be done by spray or immersion methods followed by squeegee rolls, rinsing and drying. With a no rinse system, the pretreatment can be applied using a spray- or dip application followed by squeegee rollers or roller coaters (often called chemical coater or chemcoater). In this case, no subsequent rinsing is required. This type of system has the environmental benefits of no polluting effluent. Multiple conversion coatings are available for pretreatment including, but not limited to, iron or zinc phosphates, chromates, chrome and/or heavy metal free systems, but no rinse systems are typically based on chromates or chrome and/or heavy metal free chemistry.

Once the pretreatment has been applied and dried (cured), normally the strip enters a coating room where a primer is applied usually on both sides of the sheet. Once the primer is dried and cured, often a second coater applies a topcoat. In almost all cases, the coating process is achieved by use of a roller coater, where a series of rolls transfer the liquid coating material to the strip surface. In some applications (i.e. indoor or other applications with low corrosion performance demand), only one coating layer is required.

The roller coater can be configured using different numbers of rolls, depending upon the type of coating material and how it flows (described in terms of its viscosity or rheology). However, in all cases, a thin film of wet coating material is formed on an applicator roll which then deposits this on the surface of the moving strip. Careful control of the paint film thickness, applicator roll speed and the size of the gap between the applicator roll and the strip give very good control over the coating film (coating layer) formed on the strip.

Where two or more coating materials are applied during coil coating this is done on a correspondingly configured line in which two or more application stations and, where appropriate, curing stations are connected up in series. Alternatively, following the application and curing of the first coating material, e.g., of a PVC plastisol, the coated coil is wound up again and then provided on one or both sides on a second, third, etc. coil coating line with second, third, etc., coating materials.

While roller coating is by far the most common means of applying coating material in the coil coating process, there are other techniques, some of which are currently adopted and others which have been trialed but not necessarily commercially practiced. These techniques include: Powder coating—a technique widely used for coating of preformed objects, but can also be used for coating metal strip. Curtain coating—which is a non-contact technique where coating material is fed onto the moving strip in a curtain, using gravity to feed the continuous curtain. Block coating—which employs a solid block of polymer that is smeared over the surface of the strip. Spray application—as used extensively in the automotive industry to spray the coating onto the surface. Film lamination—which has been widely used for many years to produce a variety of different finished coatings through application of an extruded laminate that is fed from a roll and adhered to the strip. Co-laminating, i.e. a hybrid of coating and laminating.

Drying and curing, respectively, occur when the wet coating material coated substrate enters an oven in which the coating layer is first dried, to remove volatile elements such as solvents, and then cured at high temperatures, for anything up to 60 seconds.

In the context of the present invention, drying or intermediate drying is thus understood to mean vaporization, or permitting vaporization, of organic solvents and/or water in a coating material applied in the production of a coating layer system, usually at a temperature elevated relative to ambient temperature. In an intermediate drying operation, the coating material applied will thus lose a proportion of organic solvents and/or water. With regard to a particular coating material, it is generally the case that the intermediate drying, compared to the curing, takes place at, for example, lower temperatures and/or for a shorter period. Therefore, the drying or intermediate drying does not give a coating layer a state ready for use, i.e. the state of a cured coating layer as described above. Accordingly, curing is clearly delimited from drying or intermediate drying operations.

The drying and cure profile is the rate of heating and cooling inside the oven and must be carefully matched to the coating material type to allow the removal of solvent without causing blisters. To ensure curing through the coating layer, it is important that the metallic substrate, rather than just the air around it, is heated. The peak metal temperature (PMT) is the maximum temperature that the metal will reach as it passes through the oven. Most organic coating materials cure in the region of 200 to 250° C. To achieve this PMT, the temperature of the oven is typically much hotter. When the strip exits the oven it is cooled with either an air or water quench. An embossing roll can be applied before the quench on thick film coatings like plastisol to apply a surface embossing whilst the thermoplastic coating is still relatively soft.

The most common drying and curing technique is to use gas-fired ovens for either convection or flotation curing. In conventional thermal coil coating, the coating is exposed to air temperatures approaching 400° C., which gradually heat through the coating and metal coil. Peak metal temperatures between 200 to 250° C. and a dwell time of 20 to 30 seconds are typically needed to fully cure a liquid coating material. The heat input is derived from gas-fired burners placed inside the oven itself, or from an incinerator or a combination of both. The ovens are typically divided into a number of zones, where the temperatures can be individually controlled. Achieving a gradual increase in temperature (e.g. a certain drying and curing profile) allows the solvents to be driven off before a cured skin is formed on the surface of the applied coating material, i.e. the coating layer. High airflows are needed in these ovens to remove the vaporized solvent from the oven and to ensure that the concentration remains beneath the lower explosion limit (LEL). If the concentration of solvent inside the oven exceeds the LEL, the potential for a sustainable explosion exists. However, below this limit there is insufficient fuel to continue an explosion in the presence of a spark. This high volume of solvent-laden hot air is treated in an incinerator to both limit any environmental impact and to maximize the energy efficiency of the process.

Alternative curing methods exist, such as electrical curing and radiation curing techniques. Electrical curing includes such techniques as induction cure or infra-red curing. Induction curing works by heating the metal substrate by passing the metal strip through a magnetic field which induces electrical currents in the strip and, through resistance, a heating effect. IR and NIR curing only heat the coating layer, not the metal substrate or surrounding air. Therefore, they can be even more energy efficient than the previous curing technologies described. Heat transfer is very quick, so total curing times can be less than 5 seconds for thin coating layer thicknesses, and only short ovens are needed. Radiation curing includes such techniques as UV cures or Electron beam curing. UV-cured coatings are based on a photo initiator and reactive monomers. Exposure of the coating layer to a concentrated UV source causes the photo initiators to decompose to produce free radicals, which start a chain reaction between the reactive monomers, forming longer polymer chains as a consequence. In electron beam (EB) curing, energy to initiate the polymerization and cross-linking reactions is delivered by a high energy electron beam. In this case, a photo initiator is not required and the high energy of the electron beam can penetrate thicker coating layers and is not affected by pigmentation.

Once the coating layer is fully cured and quenched, the strip then passes through the exit accumulator, again to support the continuous process, before being sheared and rewound to the customer's dimensions.

Since processing of the coated metallic substrate does not take place until after the coating operation, the resultant coatings need to have an extremely high mechanical integrity. The coated coils are used customarily in the architectural sector for producing ceiling and wall elements, doors, pipe insulation, roller shutters or window profiles, in the vehicle sector for producing paneling for caravans or truck bodies, and in the household sector for producing profile elements for washing machines, dishwashers, freezers or ice boxes.

It follows from the above comments, that the method of the invention preferably is a coil coating method, i.e. at least the polyvinyl chloride plastisol layer and the thermosetting and/or thermoplastic topcoat layer are produced by coil coating.

That means the system of the invention has been designed to be able to be a single pass product for use on traditional coil coating lines that consists of a standard roller coater application and a conventional gas oven cure. To enable the system of the invention to be applied in one pass through the coating line, all layers have been developed to be capable of alternative application and cure techniques, such as, for example, electrical cure methods, or spray or screen application techniques, etc.

Useful metallic substrates include, in principle, substrates comprising or consisting of, for example, iron, aluminum, copper, zinc, magnesium and alloys thereof, and steel in a wide variety of different forms and compositions.

Since the process of the invention is preferably conducted via coil coating, preferred metals are all those from which it is possible to form coils able to withstand the mechanical, chemical, and thermal stresses of coil coating. Highly preferred metals include those based on aluminium or iron. In the case of iron, particular suitability is possessed by cold-rolled steels, electrolytically galvanised steels, hot-dip galvanised steels or stainless steels.

According to the above statements, the metallic substrates preferably have the form of strips, for example steel strips. Obviously, these strips can be arranged as coils, which are unwound directly before application of the coating materials, as it is the standard within coil coating processes. The strips or coiled strips preferably have a thickness of 200 micrometer to 2 millimeter.

Prior to stage (1) of the method of the invention, the metallic substrates preferably are pretreated in a manner known per se and described above, i.e., for example, cleaned and provided with known conversion coating layers directly applied on the metallic substrate. Exemplarily conversion layers are titanium and/or zirconium based conversion layers, preferably being free of hexavalent chrome. Respective coating weights are from, for example, 2 to 10 mg coating per square meter of the metal surface.

Also, prior to stage (1) of the method of the invention and after the above specified pretreatment, preferably a typical primer coating layer is produced. According to the above statements, the primer coating layer preferably is produced directly on the conversion coating layer of the metallic substrate. Such primer coating layers and underlying primer coating materials are known by the person skilled in the art. In the context of the present invention, it is preferred that the primer layer is produced by coil coating. In particular, that means that the primer coating material preferably is applied by roller coating. Likewise, it is preferred that the applied primer coating material (i.e. the primer coating layer) is cured prior to stage (1) of the method of the invention, whereby curing preferably takes place at peak metal temperatures of between 180 to 300° C., more preferably 200 to 250° C., for a period of 10 to 300 seconds, more preferably 20 to 120 seconds. A preferred primer coating material is a thermoplastic acrylic based primer, comprising, as a binder component, acrylic resin, whereby the primer coating material preferably is free of hexavalent chrome containing pigments.

The layer thickness of the cured primer coating layer is, for example, 3 to 30 micrometer, preferably 3 to 25 micrometer. All the coating layer thicknesses stated in the context of the present invention should be understood as dry coating layer thicknesses. Thus, if it is stated that a coating material is applied in a particular coat thickness, this should be understood to mean that the coating material is applied such that the stated coat thickness results after the curing.

In stage (1) of the method of the invention, a polyvinyl chloride plastisol layer on the metallic substrate is produced, whereby this production comprises the application of a polyvinyl chloride plastisol material to the metallic substrate.

As described above, it is preferred that prior to step (1) the metallic substrate is provided with a cured conversion coating layer and a cured primer coating layer. Thus, in a preferred embodiment of the present invention, the polyvinyl chloride plastisol material is not directly applied to the metallic substrate, but directly applied to a cured primer coating layer produced prior to step (1).

As is known, PVC plastisols are colloidal dispersions of PVC, producible by emulsion or micro suspension polymerization with a plasticizer. When PVC plastisols are heated, the plasticizers diffuse into the dispersed polymer particles, where they lodge between the macromolecules and hence produce plasticization of the PVC plastisols.

Therefore, a PVC plastisol material necessarily comprises at least one PVC polymer and at least one plasticizer.

The PVC polymers preferably are constituted as particles having a particle size distribution that can be monomodal or multimodal, especially monomodal. In the case of a monomodal particle size distribution the particle size preferably lies from 10 to 100 micrometer, in particular from 10 to 60 micrometer (D50, measured by means of laser diffraction in accordance with ISO 13320:2009).

Preferred PVC plastisol materials comprise a blend of at least two PVC polymers (i.e. homopolymers) in dispersion with a plasticizer, whereby at least one PVC polymer has a particle size of 1 to 40 micrometer (D50) and exhibits, as dispersion in a plasticizer, Newtonian flow, and wherein at least one other PVC polymer has a particle size of 1 to 40 micrometer (D50) and exhibits, as dispersion in a plasticizer, pseudoplasticity.

As is known, Newtonian flow means that the viscosity of a sheared PVC plastisol remains constant while increasing the shear rate.

As is also known, pseudoplasticity means that the viscosity of a sheared PVC plastisol responds to an increase in shear rate by decreasing.

The amount of PVC homopolymers in the PVC plastisol materials used within the present invention may vary widely and is guided by the requirements of the case in hand. The PVC plastisols of the invention, based on their total amount, contain preferably from 40 to 80% by weight, more preferably from 50 to 70% by weight, and in particular from 60 to 70% by weight of at least one PVC homopolymer.

PVC homopolymers are commercial products and sold by, for example, the company Ineos, Norway, under the brand name Pevikon®, especially P1412 and Pevikon® P709, and the company Solvay, Belgium, under brand name Solvin®, especially 266sc.

The PVC plastisol material of the invention comprises at least one plasticizer. Plasticizers, especially those which are commonly used for PVC plastisols, are known by the person skilled in the art. Examples of suitable plasticizers are described by e.g. Werner Sommer in "Taschenbuch der Kunststoff-Additive", R. Gachter and H. Muller (eds.), Carl Hanser Verlag, Munich, Vienna, 1983, "5 plasticizers", pages 261 to 307. The plasticizers are preferably selected from the group consisting of phenolic esters, adipic esters, aliphatic esters, phosphates and butyric esters. Preferably, the PVC plastisols of the present invention comprise at least two, more preferably at least three, and in particular four plasticizers. The plasticizers preferably come from different classes of compounds.

The amount of plasticizers in the PVC plastisol material of invention may vary widely and is guided by the requirements of the case in hand, in particular, by their plasticizing effect in the PVC homopolymers and also by the level of thermal resistance and permanence required within the multilayer coating of the invention. The amount of plasticizers is preferably from 10 to 60% by weight, more preferably 15 to 50% weight, and in particular from 20 to 40% by weight, based in each case on the total amount of a PVC plastisol.

The PVC plastisol material used in the present invention comprises at least one layered double hydroxide (LDH).

LDH are commonly known. In the literature, LDH are frequently described by the idealized general formula $[M2^{2+}_{(1-x)} M3^{3+}_x (OH)_2]^{x+} [A^{y-}_{(x/y)} \cdot nH_2O]$ or similar empirical formulae. M2 therein stands for divalent metallic cations, M3 for trivalent metallic cations, and $A^{y-}$ for anions of average valence y. By average valence in the context of the present invention is meant the mean valence value of the possibly different anions incorporated. In the case of the naturally occurring LDH, the anions in question are generally inorganic anions such as carbonate, chloride, nitrate, hydroxide and/or bromide. The most common anions are carbonate, sulfate, chloride, and hydroxide. Various other inorganic and also organic anions may be present as well, especially in synthetic LDH. For x, values from 0.05 to 0.5 are known, whereas the fraction of water of crystallization, with values of n=0 to 10, may be very different. One known class of LDH are the hydrotalcites, which are preferred LDH in the context of the present invention. In the hydrotalcites, $Mg^{2+}$ is present as divalent cation, $Al^{3+}$ as trivalent cation, and carbonate, fundamentally, as anion. In synthetic hydrotalcites, in particular, the carbonate may have been at least proportionally substituted by hydroxide ions or by other inorganic and also organic anions. Hydrotalcites or LDH have a layerlike structure similar to brucite ($Mg(OH)_2$), in which, between two inorganic metal hydroxide layers, that carry a positive charge on account of the trivalent metal cations proportionally present, there is in each case a negatively charged layer of intercalated anions, this layer generally further comprises water of crystallization. In other words there are positively and negatively charged layers present in alternation, forming a layer structure as a result of corresponding ionic interactions. In the formula shown above, the LDH layer structure is taken into account by means of the correspondingly placed brackets. Naturally occurring LDH, e.g. hydrotalcites, as well as synthetic LDH and methods for their production, as for example the direct coprecipitation method, are known.

In the LDH comprised in the PVC plastisol material, the divalent metallic cations M2$^{2+}$ preferably are selected from the group consisting of $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$, and mixtures thereof, more preferably $Zn^{2+}$, $Mg^{2+}$, $Ca^{2+}$, $Fe^{2+}$, $Mn^{2+}$, and mixtures thereof, very preferably $Zn^{2+}$ and/or $Mg^{2+}$, more particularly $Mg^{2+}$, and the trivalent metallic cations M3$^{3+}$ are preferably selected from the group consisting of $Al^{3+}$, $Bi^{3+}$, $Fe^{3+}$, $Cr^{3+}$, $Ga^{3+}$, $Ni^{3+}$, $Co^{3+}$, $Mn^{3+}$, and mixtures thereof, more preferably $Al^{3+}$. As already mentioned, the combination of $Mg^{2+}$ and $Al^{3+}$ is realized in hydrotalcite, meaning that this combination is obviously preferred. For the same reason, while versatile inorganic and organic anions may be comprised, carbonate and hydroxide are preferred.

Preferably, the LDH are used as powders, whereby the average particle size is not per se a critical parameter and is situated for example within the low micrometer range, which is common for fillers and pigments. For example, the particle size (D50) of the LDH may be from 0.1 to 10 micrometer, preferably from 0.1 to 5 micrometer, more preferably from 0.2 to 2 micrometer (measured by means of laser diffraction in accordance with ISO 13320:2009).

The amount of LDH is preferably from 0.1 to 5% by weight, more preferably 0.2 to 4% weight, and in particular from 0.5 to 3% by weight, based in each case on the total amount of a PVC plastisol material.

The preparation of LDH is conventional. Furthermore, these compounds can be obtained as commercial products sold by, for example, the company Kisuma Chemicals under brand name Alcamizer®.

Furthermore, the PVC plastisol materials of the invention preferably comprise at least one further stabilizer. Stabilizers, especially those which are commonly used for PVC plastisols, are known by the person skilled in the art. Examples of suitable PVC stabilizers, e.g. light stabilisers like UV stabilizers are described in "Taschenbuch der Kunststoff-Additive", R. Gacheter and H. Muller (eds.), Carl Hanser Verlag, Munich, Vienna, 1983, "4 PVC stabilisers", pages 199 to 260. The stabilizers are preferably selected in particular from metal-soaps, epoxy co-stabilizers and hindered amine light stabilizers, whereby the latter ones preferably are combined with benzotriazoles (BTZ) like, in particular, 2-(2-hydroxyphenyl)-benzotriazole.

Examples of mixed metal soap stabilizers are stabilizers based on Calcium Zinc. Examples of mixed epoxy co-stabilizers are stabilizers based on epoxidized soya bean oil. Examples of hindered amine light/BTZ stabilizer blends are commercially available products as sold by, for example, BASF, under brand name Tinuvin® 5060.

Particularly preferred in the context of the present invention is that the PVC plastisol comprises, as a UV stabilizer, a blend of at least one benzotriazole with at least one hindered amine compound, in particular 2,2,6,6-tetramethyl piperidine or derivatives thereof. Even more preferred is a blend of 2-(2-hydroxyphenyl)-benzotriazole with at least one hindered amine selected from 2,2,6,6-tetramethyl piperidine or derivatives thereof.

The amount of further stabilizers, preferably the at least one blend of 2-(2-hydroxyphenyl)-benzotriazole with at least one hindered amine selected from 2,2,6,6-tetramethyl piperidine or derivatives thereof, preferably is from 0.01 to 5% by weight, more preferably 0.2 to 4% weight, and in particular from 0.5 to 3% by weight, based in each case on the total amount of a PVC plastisol.

Furthermore, the PVC plastisol material may comprise further components commonly known as constituents of plastisol materials, for example, pigments, fillers, organic solvents or further additives like flame retardants and the like.

The preparation of the PVC plastisol materials of the invention has no peculiarities in terms of method but instead takes place by the mixing of the above-described constituents. This can be done using mixing equipment, such as stirred tanks, dissolvers, including inline dissolvers, bead mills, agitator mills static mixers, toothed-wheel dispersers or extruders. However, preferably mixing is performed under vacuum.

The production of the polyvinyl chloride plastisol layer comprises the application of the above described polyvinyl chloride plastisol material to the metallic substrate, preferably not directly to the metallic substrate, but directly to a cured primer coating layer on the substrate.

In the context of the present invention, it is preferred that the PVC plastisol layer is produced by coil coating. In particular, that means that the PVC plastisol coating material preferably is applied by roller coating.

The applied PVC plastisol material (i.e. the PVC plastisol layer) may be, prior to stage (2) of the method of the invention, cured, whereby a cured PVC plastisol layer results. If the PVC plastisol layer is cured prior to stage (2), curing preferably takes place at peak metal temperatures of between 180 to 300° C., more preferably 200 to 250° C., for a period of 10 to 300 seconds, more preferably 20 to 120 seconds. In the context of the present invention it is preferred that the PVC plastisol layer is cured separately, i.e. prior to stage (2) of the method of the invention. The layer thickness of the cured PVC plastisol layer is, for example, 50 to 400 micrometers, preferably 150 to 250 micrometers.

In stage (2) of the method of the invention, a thermosetting and/or thermoplastic topcoat layer is produced directly on the PVC plastisol layer, whereby this production comprises the application of a thermosetting and/or thermoplastic coating material directly to the PVC plastisol layer.

Obviously, the thermosetting and/or thermoplastic coating material is different from the PVC plastisol material. Accordingly, thermosetting and/or thermoplastic coating material are those familiar to the person skilled in the art and frequently used as coatings materials for production of topcoats.

Coating materials comprising at least one binder component comprising reactive functional groups, e.g. hydroxyl groups, and at least one crosslinker component comprising functional groups reactive with the functional groups of the at least one binder component can be used as thermosetting coating materials. For example, appropriate thermosetting coating materials comprise at least one hydroxy-functional resin, for example a hydroxy-functional polyester resin or hydroxy-functional acrylic resin, combined with a polyisocyanate or melamine resin as crosslinker. As already described above, the named components react with each other when, for example, such an applied coating material is heated, i.e. when chemical cross-linking reactions occur. Upon cooling a highly durable finish is formed. Where appropriate, a catalyst may be present to effect and/or enhance the crosslinking process.

In particular, thermosetting coating materials comprising at least one hydroxy-functional polyester resin as binder component and at least one polyisocyanate as a crosslinker component are preferred in the context of the present invention, since they provide excellent adhesion characteristics over the PVC plastisol layer. Moreover, they are curable by NIR or Induction curing in addition to more conventional curing techniques like simple heating.

The hydroxy-functional polyester resins are preferably selected from the group consisting of saturated polyester resins. Such resins are commercial products and sold by, for example, Cray Valley, under brand name Synolac®, especially 9635.

Suitable polyisocyanates are, for example, aliphatic and aromatic polyisocyanates like diisocyanates, and their dimers and trimers, such as uretdiones and isocyanurates. Reference may be made, for example, to hexamethylene diisocyanate, isophorone diisocyanate, dicyclohexylmethane 2,4'-diisocyanate and uretdiones and isocyanurates of these diisocyanates. Of course, also macromolecular polyisocyanates, i.e. polyisocyanates based on, for example, the above named diisocyanates, reacted with each other and/or further components to adducts with higher molecular weight, may be used. The polyisocyanates as crosslinker components are preferably selected from the group of blocked polyisocyanates, i.e. the isocyanate groups are not free, but reversibly reacted with generally known blocking agents. As also known, such isocyanate groups are deblocking under certain conditions, in particular when heated, meaning that the blocking agent is released and the free isocyanate groups are available for crosslinking reactions with e.g. hydroxyl groups. Cross-linker polyisocyanates are commercial products and sold by, for example, Bayer, under brand name Desmodur®, especially BL3175.

The amount of hydroxy-functional polyester resin as binder component and polyisocyanate as a crosslinker component may vary widely and is guided by the requirements of the case in hand, in particular by the level of pigment within such a coating material. The weight ratio of hydroxy-functional polyester resin to polyisocyanate as a crosslinker component is preferably chosen so that the respective coating composition exhibits a strongly crosslinked polymer matrix to maximize hardness. The weight ratio is preferably from 5:1 to 2:1, more preferably 4:1.

The described hydroxy-functional polyester based coating material preferably comprises at least one catalyst for the reaction of isocyanate groups and hydroxyl groups. Suitable catalysts are the known metal catalysts such as, for example, tin, molybdenum, zirconium, or zinc catalysts. Preferred catalysts are tin compounds such as dimethyltin dilaurate or dibutyltin dilaurate, especially dibutyltin dilaurate (DBTL).

The DBTL catalyst is e.g. a commercial product and sold by, for example, Akros, under brand name Tinstab® BL277.

Furthermore, thermosetting coating materials comprising hydroxy-functional acrylic resin as binder component and polyisocyanate as a crosslinker component are preferred in the context of the present invention, since they provide highly durable layers over the PVC plastisol layer. Moreover, they are curable by NIR or Induction curing in addition to more conventional curing techniques like simple heating.

Similar to the above described thermosetting coating materials comprising hydroxy-functional polyester resins, the materials comprising hydroxy-functional acrylic resin preferably also comprise, as a crosslinker component, a polyisocyanate selected from the group of blocked polyisocyanates.

The amount of hydroxy-functional acrylic resin as binder component and polyisocyanate as a crosslinker component may vary widely and is guided by the requirements of the case in hand, in particular by the level of pigment within such a coating material. The weight ratio of hydroxy-functional acrylic resin to polyisocyanate as a crosslinker component is preferably chosen so that the respective coating composition exhibits a strongly crosslinked polymer matrix to maximize hardness. The weight ratio is preferably from 3:1 to 1:3, more preferably 1:1.

The described hydroxy-functional acrylic resin coating material preferably comprises at least one catalyst for the reaction of isocyanate groups and hydroxyl groups. Suitable catalysts are the known metal catalysts such as, for example, tin, molybdenum, zirconium, or zinc catalysts. Preferred catalysts are tin compounds such as dimethyltin dilaurate or dibutyltin dilaurate, especially dibutyltin dilaurate (DBTL). The DBTL catalyst is e.g. a commercial product and sold by, for example, Akros, under brand name Tinstab® BL277.

While thermosetting coating materials are preferred, the use of thermoplastic coating materials is also possible. One particularly group of preferred thermoplastic coating materials is the group of polyvinylidene fluoride based coating materials, i.e. coating materials comprising, as a binder component, polyvinylidene fluoride resins. The alternated $CH_2$ and $CF_2$ groups along a polyvinylidene fluoride polymer chain provide a unique polarity that influences its solubility and electric properties. The polyvinylidene fluoride base coating materials offer very high UV resistance levels for a coating layer produced therefrom.

As already described, such a thermosetting coating material comprises at least one thermoplastic resin, namely polyvinylidene fluoride resin. These resins typically are crystalline, high molecular weight powder forms of polyvinylidene fluoride specifically designed for organic solvent-based coating materials. Thus, preferred polyvinylidene fluoride based coating materials also comprise at least one organic solvent. Polyvinylidene fluoride resins are available as commercial products and sold by, for example, Arkema, under brand name Kynar®, especially 500.

The amount of polyvinylidene fluoride resin in the thermoplastic polyvinylidene fluoride based coating materials may vary widely and is guided by the requirements of the case in hand. The polyvinylidene fluoride based coating materials, based on their total amount, contain preferably from 40 to 80% by weight of at least one polyvinylidene fluoride resin.

The thermosetting and/or thermoplastic coating material comprises at least one LDH. All of the above embodiments relating to the LDH comprised in the PVC plastisol material are also valid in respect of the LDH comprised in the thermosetting and/or thermoplastic coating material. This is also true especially of all the preferred, more preferred and most preferred features. Preferably, the PVC plastisol material and the thermosetting and/or thermoplastic coating material comprise the same LDH.

The amount of LDH is preferably from 0.1 to 5% by weight, more preferably 0.2 to 4% weight, and in particular from 0.5 to 3% by weight, based in each case on the total amount of the thermosetting and/or thermosetting coating material.

Furthermore, the thermosetting and/or thermoplastic coating material of the invention preferably comprises at least one further stabilizer. Again, all of the above embodiments relating to the stabilizers comprised in the PVC plastisol material are also valid in respect of the stabilizers comprised in the thermosetting and/or thermoplastic coating material. This is also true, especially for all the preferred, more preferred and most preferred features. Preferably, the PVC plastisol material and the thermosetting and/or thermoplastic coating material comprise the same stabilizers.

Thus, particularly preferred in the context of the present invention is that the thermosetting and/or thermoplastic coating material comprises, as a UV stabilizer, a blend of at least one benzotriazole with at least one hindered amine compound, in particular 2,2,6,6-tetramethyl piperidine or derivatives thereof. Even more preferred is a blend of 2-(2-hydroxyphenyl)-benzotriazole with at least one hindered amine selected from 2,2,6,6-tetramethyl piperidine or derivatives thereof.

The amount of further stabilizers, preferably the at least one blend of 2-(2-hydroxyphenyl)-benzotriazole with at least one hindered amine selected from 2,2,6,6-tetramethyl piperidine or derivatives thereof, preferably is from 0.01 to 5% by weight, more preferably 0.1 to 4% weight, and in particular from 0.2 to 3% by weight, and even more preferred 0.5 to 3% by weight, based in each case on the total amount of the thermosetting and/or thermoplastic coating material.

Furthermore, the thermosetting and/or thermoplastic coating material may comprise further components commonly known as constituents of thermosetting and/or thermosetting coating material, for example, pigments, fillers, organic solvents or further additives like flame retardants and the like.

The thermosetting and/or thermoplastic coating materials employed in accordance with the invention may be produced using the mixing assemblies and mixing techniques that are customary and known for producing such coating materials.

The production of the thermosetting and/or thermoplastic topcoat layer comprises the application of the above described thermosetting and/or thermoplastic coating material directly to the PVC plastisol layer.

In the context of the present invention, it is preferred that the thermosetting and/or thermoplastic topcoat layer is produced by coil coating. In particular, that means that the thermosetting and/or thermoplastic coating material preferably is applied by roller coating.

The applied thermosetting and/or thermoplastic coating material (i.e. the thermosetting and/or thermoplastic topcoat layer) is typically cured, whereby a cured thermosetting and/or thermoplastic topcoat layer results. Curing preferably takes place at peak metal temperatures of between 180 to 300° C., more preferably 200 to 250° C., for a period of 10 to 300 seconds, more preferably 20 to 120 seconds. If the PVC plastisol layer was not cured prior to the application of the thermosetting and/or thermoplastic coating material, obviously the PVC plastisol layer is jointly cured with the applied thermosetting and/or thermoplastic coating material.

However, as already mentioned above, in the context of the present invention it is preferred that the PVC plastisol layer is cured separately.

The layer thickness of the cured thermosetting and/or thermoplastic topcoat layer is, for example, 2 to 50 micrometer, preferably 5 to 25 micrometer.

In the following, some further information is given with respect to the application and curing techniques of the method of the invention.

As already stated, the PVC plastisol materials and thermosetting and/or thermoplastic coating material are highly suitable for use as coil coating materials. For coil coating the metal coil runs through a coil coating line as, for example, described in German patent application DE 196 32 426 A1, at a speed adapted to the application and curing properties of the coating material employed. The speed may therefore vary widely from 6 to 180 m/min, with particular preference from 20 to 120 m/min, and in particular, 20 to 90 m/min.

Therefore, even if the PVC plastisol material and thermosetting and/or thermoplastic coating material can be applied in any way, for example, by spraying, flow coating or roll coating, among these application techniques roll coating is particularly advantageous and is therefore used with preference in accordance with the invention.

Each application step in roll coating can be conducted with two or more rolls. Preference is given to employing from two to four rolls, and especially 3 rolls with a doctor blade.

In the case of roll coating the rotating pick-up roll dips into a reservoir of, for example, the PVC plastisol material and so picks up the material to be applied. This material is typically passed through a gap created with a metering-roll to level the surface and remove the excess material to achieve the desired coating layer thickness. This material is then transferred from the pick-up roll to a rotating application roll directly or via at least one transfer roll. The material is stripped from this application roll and so transferred to the coil as it runs in the same or opposite direction.

As an alternative, for example, the PVC plastisol material can be pumped directly into a gap between the rolls, thus being referred to by those in the art as nip feeding.

In accordance with the invention, transfer by reverse stripping, or the reverse roller coating technique, is of advantage and is therefore employed with preference.

In the case of roll coating the circumferential speeds of the pick-up roll, the metering roll, and the application roll may vary greatly from one coating operation to another. The application roll preferably has a circumferential speed which is from 120 to 140% of the coil speed, and the pick-up roll a circumferential speed which is from 110 to 125% of the coil speed.

Heating the coating layers, for example the PVC plastisol layer, in the case of thermal curing is accomplished preferably by convection heat transfer, irradiation with near or far infrared and/or, in the case of iron-based coils, by electrical induction. The maximum substrate temperature or PMT is preferably at most 220° C., and in particular 216° C. It is a particular advantage of the PVC plastisol materials and of the method of the invention that comparatively low temperatures can be employed and yet result in coating layers retaining an embossed pattern and having outstanding performance properties.

Where essentially convection heat transfer is employed, forced-air ovens with a length of from 20 to 50 m are needed, at the preferred coil speeds. The forced-air temperature is preferably below 300° C.

The above described application and curing methods can also be employed for the application and curing of the thermosetting and/or thermosetting coating material following the application stage of the PVC plastisol material. The same accounts for the application and curing of further coating materials, e.g. primer coating materials.

Where two or more coating materials are applied during coil coating this is done on e.g. a corresponding configuration line in which two or more application stations and, where appropriate, curing stations are connected up in a series. Alternatively, following the application and curing of the first coating material, e.g., of the PVC plastisol material, the coated coil is wound up again and then provided on one or both sides on at least one further coil coating line with at least one further coating layer.

After the coated coils have been produced they can be wound up and then processed further at a different place; alternatively they can be processed further directly as they come from the coil coating operation. Following a reduction in size they can be machine-shaped into parts of appropriate size. Examples of suitable machine shaping methods include pressing and deep drawing.

The resultant coils, profile elements, and shaped parts of the invention are scratch-resistant, stable to corrosion, stable to weathering, and stable to chemicals. The coated coils produced by the method of the invention are therefore outstanding suitable for the architectural sector, both for interior and exterior use, for the purpose, for example, of producing roofing and wall elements, doors, gates, pipe insulation, roller shutters, or window profiles.

The present invention is elucidated below by examples.

EXAMPLES

1. Production of Coating Compositions

PVC Plastisol Materials

Examples 1 to 3 (Inventive) and C1 to C3 (Comparative)

The PVC plastisol materials 1 to 3 and C1 to C3 were prepared by mixing the ingredients indicated in table 1 and table 2 in the amounts specified therein and homogenizing the resulting mixtures.

TABLE 1

The physical composition of PVC plastisol materials 1 to 3

| Ingredient | Amount (% by weight) in example: | | |
|---|---|---|---|
| | 1 | 2 | 3 |
| PVC homopolymer | | | |
| Pevikon ® P1412 from Ineos, Norway PVC homopolymer | 25 | 22 | 25 |
| Pevikon ® P709 from Ineos, Norway PVC homopolymer | 20 | 18 | 15 |
| Solvin ® 266sc from Solvay, Belgium Plasticizers | 16 | 16 | 20 |
| Hexamoll ® DINCH from BASF, Germany | 15 | 10 | 5 |
| Plasomoll ® DNA from BASF, Germany | 5 | 0 | 0 |
| TXIB ® (commercial 2,2,4-trimethyl-1,3-Pentanediol diisobutyrate from Easman) | 5 | 5 | 0 |

TABLE 1-continued

The physical composition of PVC plastisol materials 1 to 3

| Ingredient | Amount (% by weight) in example: | | |
|---|---|---|---|
| | 1 | 2 | 3 |
| Diolplex ® 7017 (commercial polymeric adipate from Hyperlast) | 0 | 10 | 0 |
| Phosflex ® from ICL Industrial Products | 0 | 5 | 20 |
| Stabilizers | | | |
| Cz723 (commercial calcium/zinc PVC Stabiliser from Reagens) | 2 | 2 | 2 |
| Celloxide 2021 (commercial cycloaliphatic Epoxy resin from Dycel) | 2 | 2 | 2 |
| Tinuvin 5060 (commercial hindered amine Light stabiliser from BASF) | 1 | 0.4 | 0.3 |
| Alcamizer ® (commercial hydrotalcite based on Aluminium oxide from Kisuma) | 1.5 | 1.5 | 1.5 |
| Solvents and pigments | 7.5 | 6.1 | 9.2 |

TABLE 2

The physical composition of PVC plastisol materials C1 to C3

| Ingredient | Amount (% by weight) in example: | | |
|---|---|---|---|
| | C1 | C2 | C3 |
| PVC homopolymer | | | |
| Pevikon ® P1412 from Ineos, Norway PVC homopolymer | 35 | 35 | 35 |
| Solvin ® 266sc from Solvay, Belgium Plasticizers | 25 | 25 | 25 |
| Palatinol ® 10-P (commercial Phthalic acid ester from BASF) | 18 | — | — |
| Hexamoll ® DINCH (commercial 1,2-cyclohexane dicarboxylic acid diisononyl ester from BASF) | — | 17 | 10 |
| Plastomoll ® DNA from BASF, Germany | 5 | 5 | 10 |
| TXIB ® (commercial 2,2,4-trimethyl-1,3-Pentanediol diisobutyrate from Eastman) | 5 | 5 | 7 |
| Stabilizers | | | |
| SLX781 (commercial barium/zinc PVC Stabiliser from Reagens) | 1 | 2 | 2 |
| Celloxide 2021 (commercial cycloaliphatic Epoxy resin from Dycel) | 1 | 2 | 2 |
| Solvents and pigments | 10 | 9 | 9 |

Thermosetting Coating Materials Based on Hydroxy-Functional Polyester Resin as Binder Component and Blocked Polyisocyanate as a Crosslinker Examples 4 to 6 (Inventive) and C4 to C6 (Comparative)

The thermosetting coating materials 4 to 6 and C4 to C6 were prepared by mixing the ingredients indicated in table 3 and table 4 in the amounts specified therein and homogenizing the resulting mixtures.

TABLE 3

The physical composition of thermosetting coating materials 4 to 6

| Ingredient | Amount (% by weight) in example: | | |
|---|---|---|---|
| | 4 | 5 | 6 |
| Hydroxy-functional polyester resin Synolac ® 9635, from Cray Valley | 50 | 50 | 40 |
| Blocked Polyisocyanate Crosslinker Desmodur ® BL3175 from Bayer | 12 | 12 | 14 |
| Catalyst DBTL Tin Catalyst (commercial Dibutyltin Dilaurate from Akros) | 0.2 | 0.2 | 0.2 |
| Stabilizer | 1 | 1 | 1.5 |
| Tinuvin 5060 (commercial hindered amine Light stabiliser from BASF) | | | |
| Alcamizer ® (commercial hydrotalcite based on Aluminium oxide from Kisuma) | 1.5 | 1.5 | 1.5 |
| Solvents and pigments | 35.3 | 35.3 | 42.8 |

TABLE 4

The physical composition of thermosetting coating materials C4 to C6

| Ingredient | Amount (% by weight) in example: | | |
|---|---|---|---|
| | C4 | C5 | C6 |
| Hydroxy-functional polyester resin combined with blocked Polyisocyanate Crosslinker Vesticoat ® 1051, from Evonik | 60 | 50 | 45 |
| Catalyst DBTL Tin Catalyst (commercial Dibutyltin Dilaurate from Akros) | 0.2 | 0.2 | 0.1 |
| Solvents and pigments | 39.8 | 49.8 | 54.9 |

Thermosetting Coating Materials Based on Hydroxy-Functional Acrylic Resin as Binder Component and Blocked Polyisocyanate as a Crosslinker Examples 7 to 9 (Inventive) and C7 to C9 (Comparative)

The thermosetting coating materials 7 to 9 and C7 to C9 were prepared by mixing the ingredients indicated in table 5 and table 6 in the amounts specified therein and homogenizing the resulting mixtures.

TABLE 5

The physical composition of thermosetting coating materials 7 to 9

| Ingredient | Amount (% by weight) in example: | | |
|---|---|---|---|
| | 7 | 8 | 9 |
| Hydroxyl-functional acrylic resin Uracron CR-201 S1-65, from DSM | 43 | 40 | 40 |
| Blocked Polyisocyanate Crosslinker Desmodur ® BL3575 from Bayer | 45 | 30 | 50 |
| Catalyst DBTL Tin Catalyst (commercial Dibutyltin Dilaurate from Akros) | 0.3 | 0.2 | 0.2 |
| Stabilizer | 1 | 1 | 1.5 |
| Tinuvin 5060 (commercial hindered amine Light stabiliser from BASF) | | | |

TABLE 5-continued

The physical composition of thermosetting coating materials 7 to 9

| Ingredient | Amount (% by weight) in example: | | |
|---|---|---|---|
| | 7 | 8 | 9 |
| Alcamizer ® (commercial hydrotalcite based on Aluminium oxide from Kisuma) | 1.5 | 1.5 | 1.5 |
| Solvents and pigments | 9.2 | 27.3 | 6.8 |

TABLE 6

The physical composition of thermosetting coating materials C7 to C9

| Ingredient | Amount (% by weight) in example: | | |
|---|---|---|---|
| | C7 | C8 | C9 |
| Hydroxyl-functional acrylic resin PARALOID ® AT-746, from Dow | 40 | 60 | 20 |
| Blocked Polyisocyanate Crosslinker Desmodur ® BL3175 from Bayer | 40 | 20 | 60 |
| Catalyst DBTL Tin Catalyst (commercial Dibutyltin Dilaurate from Akros) | 0.3 | 0.2 | 0.2 |
| Solvents and pigments | 19.7 | 19.7 | 19.7 |

Thermosetting Coating Material Based on Hydroxy-Functional Polyester Resin and Melamine Resin as a Crosslinker The thermosetting coating material C10 was prepared by mixing the ingredients indicated in table 7 in the amounts specified therein and homogenizing the resulting mixtures.

TABLE 7

The physical composition of thermosetting coating material C10

| Ingredient | Amount (% by weight) in example: 10 |
|---|---|
| Hydroxy-functional polyester resin Synolac ® 9605, from Cray Valley | 45 |
| Melamine-formaldehyde resins Luwipal 066, from BASF | 5 |
| Catalyst Dynapol ® 1203 (commercial blocked sulfonic acid catalyst from Evonik) | 0.3 |
| Solvents and pigments | 49.7 |

2. Production of Coatings on Metallic Substrates

In each case, a 0.5 mm galvanised steel sheet (alloy blend of 95% Zinc, 5% aluminium) was cleaned and coated with pre-treatment conversion coating based on a titanium/zirconium based pretreatment material that was free from hexavalent chrome pigment to a nominal coatings weight of 2 to 10 mg coating per square meter of the substrate surface through use of squeegee roll application. The conversion coating was dried at a temperature of 90° C. (oven temperature) for 2 seconds in a conventional electric box oven. Then, a primer coating material based on thermoplastic acrylic resin was applied using a bar coater application to a nominal thickness of 5 micrometer and was cured in a conventional electric box oven to a peak metal temperature of 215° C. To achieve 215° C., the oven had a constant air temperature of 280° C. and the coated steel sheet (panel) had a dwell time of 45 seconds. The panel was air cooled to ambient temperature and then coated with a PVC plastisol to a nominal thickness of 200 micrometer by means of three roll reverse roller application at a speed of 20 m/min. The panel was then cured as described above to a peak metal temperature of 210° C. at a dwell time of 43 seconds. The panel was air cooled to ambient temperature and was further coated with a top coating material to a nominal thickness of 20 micrometer using a two roll half reverse roller application at a speed of 20 m/min. The panel was then cured as described above to a peak metal temperature of 220° C. at a dwell time of 50 seconds.

3. Investigation of Properties of Coatings on Metallic Substrates

Some of the coatings on metallic substrates prepared as described under item 2. were subsequently investigated for different properties. For the purposes of demonstrating the benefits of the inventive multilayer coatings, their performance was compared to the current state of the art high durability PVC plastisol layers on metallic substrates and thermosetting topcoat layers based on hydroxy-functional polyester resin as binder component and blocked polyisocyanate as a crosslinker on metallic substrates currently available. Specifically, the following coating materials were used: The current state of the art high durability PVC plastisol layers are based on PVC plastisol material C1. The current state of the art thermosetting topcoat layers are based on thermosetting coating material C4. For the multilayer coatings of the invention PVC plastisol material 1 and thermosetting coating material 4 were used. For each identified benefit, the multilayer coating of the invention has been compared to the current worse performing coating type (either PVC plastisol layer or thermosetting topcoat layer based on polyester/polyisocyanate), as the multilayer coating of the invention aims to eliminate the inherent weaknesses for each product. Furthermore, all inventive systems as well as the state of the art PVC and polyester/polyisocyanate systems were compared to the state of the art polyester system, i.e. the coating on metallic substrate based on coating material C10. That means, all given data are in comparison to the coating based on coating material C10. The reason is that such a polyester system depicts the industrial standard coil coating. With this in mind, the following examples of performance have been compiled to show the improved properties of the multilayer coating of the invention against the coating layer type that has a weakness in the particular test parameter. Table 8 summarized the obtained data.

TABLE 8

Properties of coatings on metallic substrates

| Test parameter | Test method | Only PVC plastisol material | Only thermosetting material | Multilayer coating of the invention |
|---|---|---|---|---|
| Corrosion resistance | EN 13523-8:2002 (Resistance to salt spray (fog)) | ++ | + | ++ |
| UV resistance | EN 13523-10:2001 (Resistance to fluorescent light and water condensation) | + | ++ | ++ |
| Thermal resistance | EN 13523-13:2001 (Resistance to accelerated aging by the use of heat) | − | ++ | ++ |
| Chemical resistance | EN 13523-13:2001 (Resistance to accelerated aging by the use of heat) | + | + | + |
| Robustness | EN 13523-12:2004 (Resistance to scratching) EN 13523-16:2004 (Resistance to abrasion) | ++ | + | ++ |
| Flexibility | EN 13523-7 (Resistance to cracking on bending (T-bend test)) | ++ | + | ++ |
| Adhesion | EN 13523-6 (Adhesion after indentation (cupping test)) | 0 | ++ | ++ |
| Embossing | N/a | ++ | − | ++ |
| Fire resistance | EN 15501, BS 476 Part 6&7 | − | ++ | ++ |
| Water harvesting | BS 6920:2000 (suitable for use in contact with potable water) | − | ++ | ++ |
| Food contact | 21 CFR 175.300 | − | + | + |

Key
− = Poor performance compared to the coating based on C10.
0 = Performance is comparable to the coating based on C10.
+ = Performance out performs the coating based on C10.
++ = Performance vastly superior to the coating based on C10.

The results show that the multilayer coatings of the invention combine excellent corrosion resistance with high UV and thermal resistance properties. Besides, the inventive multilayer coatings also offer further technical advantages such as the ability to emboss the coating with a decorative pattern or corporate logo, or to enable features such as water potability, enhanced fire resistance and special optical effects. Furthermore, the multilayer coatings outperform the standard systems of the state of the art.

The multilayer coatings of the invention are therefore very well suited for producing weathering resistant elements in, for example, the architectural sector, for example construction elements.

The invention claimed is:

1. A method for producing a multilayer coating on a metallic substrate, comprising, in the given order,
   (1) producing a polyvinyl chloride plastisol layer on the metallic substrate, comprising the application of a polyvinyl chloride plastisol material to the metallic substrate and curing the polyvinyl chloride plastisol layer,
   (2) producing a thermosetting topcoat layer directly on the polyvinyl chloride plastisol layer, comprising the application of a thermosetting coating material directly to the polyvinyl chloride plastisol layer and curing the thermosetting topcoat layer,
   wherein the layer thickness of the cured polyvinyl chloride plastisol layer is from 50 to 400 micrometer and the layer thickness of the cured thermosetting topcoat layer is 2 to 50 micrometers,
   wherein both the polyvinyl chloride plastisol material and the thermosetting coating material comprise a layered double hydroxide, and
   wherein
      both the polyvinyl chloride plastisol material and the thermosetting coating material comprise, as a UV stabilizer, a blend of at least one 2-(2-hydroxyphenyl)-benzotriazole with at least one hindered amine selected from 2,2,6,6-tetramethyl piperidine and derivatives thereof,
      the amounts of layered double hydroxide is from 0.1 to 5% by weight based on the total amount of polyvinyl chloride plastisol material and the thermosetting coating material, respectively, and the amounts of the UV stabilizer blend is from 0.1 to 5% by weight based on the total amount of polyvinyl chloride plastisol material and the thermosetting coating material, respectively,
      the thermosetting coating material comprises at least one hydroxy-functional acrylic resin as binder component and at least one polyisocyanate as crosslinker component, or at least one hydroxy-functional polyester resin as binder component and at least one polyisocyanate as crosslinker component, and
      wherein the thermosetting coating material is free from thermoplastic coating material.

2. A method for producing a multilayer coating on a metallic substrate, comprising, in the given order,
   (1) producing a polyvinyl chloride plastisol layer on the metallic substrate, comprising the application of a polyvinyl chloride plastisol material to the metallic substrate and curing the polyvinyl chloride plastisol layer, (2) producing a thermosetting topcoat layer directly on the polyvinyl chloride plastisol layer, comprising the application of a thermosetting coating material directly to the polyvinyl chloride plastisol layer and curing the thermosetting topcoat layer, wherein the layer thickness of the cured PVC plastisol layer is from 50 to 400 micrometer and the layer thickness of the cured thermosetting topcoat layer is 2 to 50 micrometers wherein both the polyvinyl chloride plastisol material and the thermosetting coating material comprise a layered double hydroxide, and wherein both the polyvinyl chloride plastisol material and the thermosetting coating material comprise, as a UV stabilizer, a blend of at least one 2-(2-hydroxyphenyl)-benzotriazole with at least one hindered amine selected from 2,2,6,6-tetramethyl piperidine and derivatives thereof, the amounts of layered double hydroxide is from 0.1 to 5% by weight based on the total amount of polyvinyl chloride plastisol material and the thermosetting coating material, respectively, and the amounts of the UV stabilizer blend is from 0.1 to 5% by weight based on the total amount of polyvinyl chloride plastisol material and the thermosetting coating material, respectively, and the thermosetting coating material comprises at least one hydroxy-functional acrylic resin as the only binder component and at least one polyisocyanate as crosslinker component, or at least one hydroxy-functional polyester resin as the only binder component and at least one polyisocyanate as crosslinker component.

3. The method according to claim 2, wherein the polyvinyl chloride plastisol layer and the thermosetting topcoat layer are produced by coil coating.

4. The method according to claim 2, wherein, prior to stage (1), a cured conversion coating layer is produced directly on the metallic substrate and a cured primer coating layer is produced directly on the cured conversion coating layer, whereby the polyvinyl chloride plastisol layer is then produced directly on the cured primer coating layer.

5. The method according to claim 2, wherein the at least one layered double hydroxide is a hydrotalcite.

6. The method according to claim 2, wherein both the polyvinyl chloride plastisol material and the thermosetting coating layer comprise the same layered double hydroxide.

7. The method according to claim 2, wherein both the polyvinyl chloride plastisol layer and the thermosetting coating layer are cured at peak metal temperatures of between 180 to 300° C. for a period of 10 to 300 seconds.

8. The method according to claim 2, wherein the metallic substrate is selected from substrates consisting of iron, aluminum, copper, zinc, magnesium and alloys thereof, and steel.

9. A multilayer coating produced by a method according to claim 2.

10. A metallic substrate, wherein the metallic substrate is coated with a multilayer coating according to claim 9.

11. A method for producing a multilayer coating on a metallic substrate, comprising, in the given order, (1) producing a polyvinyl chloride plastisol layer on the metallic substrate, comprising the application of a polyvinyl chloride plastisol material to the metallic substrate, (2) producing a thermosetting topcoat layer directly on the polyvinyl chloride plastisol layer, comprising the application of a thermosetting coating material directly to the polyvinyl chloride plastisol layer, wherein both the polyvinyl chloride plastisol layer and the thermosetting coating layer are cured at peak metal temperatures of between 180 to 300° C. for a period of 10 to 300 seconds, wherein both the polyvinyl chloride plastisol material and the thermosetting coating material comprise a layered double hydroxide, and wherein both the polyvinyl chloride plastisol material and the thermosetting coating material comprise, as a UV stabilizer, a blend of at least one 2-(2-hydroxyphenyl)-benzotriazole with at least one hindered amine selected from 2,2,6,6-tetramethyl piperidine and derivatives thereof, the amounts of layered double hydroxide is from 0.1 to 5% by weight based on the total amount of polyvinyl chloride plastisol material and the thermosetting coating material, respectively, and the amounts of the UV stabilizer blend is from 0.1 to 5% by weight based on the total amount of polyvinyl chloride plastisol material and the thermosetting coating material, respectively, the thermosetting coating material comprises at least one hydroxy-functional acrylic resin as binder component and at least one polyisocyanate as crosslinker component, or at least one hydroxy-functional polyester resin as binder component and at least one polyisocyanate as crosslinker component, and wherein the thermosetting coating material is free from thermoplastic coating material.

12. The method according to claim 11, wherein stage (1) further comprises the curing of the polyvinyl chloride plastisol layer and stage (2) further comprises the curing of the thermosetting topcoat layer.

13. The method according to claim 12, wherein the layer thickness of the cured PVC plastisol layer is from 50 to 400 micrometer and the layer thickness of the cured thermosetting topcoat layer is 2 to 50 micrometers.

14. The method according to claim 11, wherein the polyvinyl chloride plastisol layer and the thermosetting topcoat layer are produced by coil coating.

15. The method according to claim 11, wherein, prior to stage (1), a cured conversion coating layer is produced directly on the metallic substrate and a cured primer coating layer is produced directly on the cured conversion coating layer, whereby the polyvinyl chloride plastisol layer is then produced directly on the cured primer coating layer.

16. The method according to claim 11, wherein the at least one layered double hydroxide is a hydrotalcite.

17. The method according to claim 11, wherein both the polyvinyl chloride plastisol material and the thermosetting coating layer comprise the same layered double hydroxide.

18. The method according to claim 11, wherein the metallic substrate is selected from substrates consisting of iron, aluminum, copper, zinc, magnesium and alloys thereof, and steel.

19. A method for producing a multilayer coating on a metallic substrate, comprising, in the given order, (1) producing a polyvinyl chloride plastisol layer on the metallic substrate, comprising the application of a polyvinyl chloride plastisol material to the metallic substrate,
(2) producing a thermosetting topcoat layer directly on the polyvinyl chloride plastisol layer, comprising the application of a thermosetting coating material directly to the polyvinyl chloride plastisol layer,
wherein both the polyvinyl chloride plastisol layer and the thermosetting coating layer are cured at peak metal temperatures of between 180 to 300° C. for a period of 10 to 300 seconds,
wherein both the polyvinyl chloride plastisol material and the thermosetting coating material comprise a layered double hydroxide, and
wherein
both the polyvinyl chloride plastisol material and the thermosetting coating material comprise, as a UV stabilizer, a blend of at least one 2-(2-hydroxyphenyl)-benzotriazole with at least one hindered amine selected from 2,2,6,6-tetramethyl piperidine and derivatives thereof,
the amounts of layered double hydroxide is from 0.1 to 5% by weight based on the total amount of polyvinyl chloride plastisol material and the thermosetting coating material, respectively, and the amounts of the UV stabilizer blend is from 0.1 to 5% by weight based on the total amount of polyvinyl chloride plastisol material and the thermosetting coating material, respectively, and
the thermosetting coating material comprises at least one hydroxy-functional acrylic resin as the only binder component and at least one polyisocyanate as crosslinker component, or at least one hydroxy-functional polyester resin as the only binder component and at least one polyisocyanate as crosslinker component.

* * * * *